May 17, 1960
M. BERLIN ET AL
2,936,657
DRILL-CENTERING JIG
Filed May 28, 1956
FIG.1
FIG.2
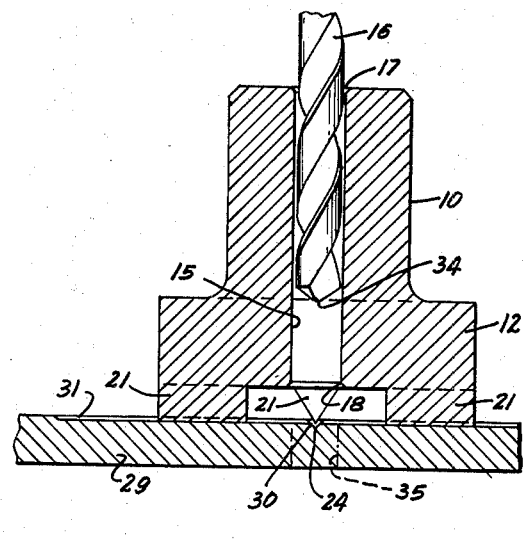
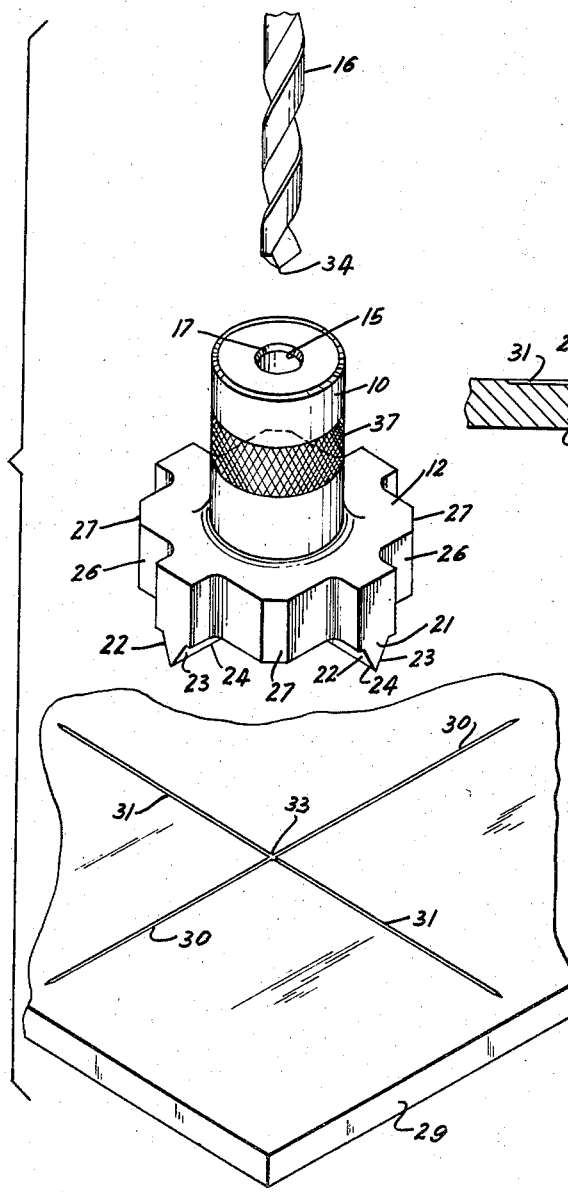
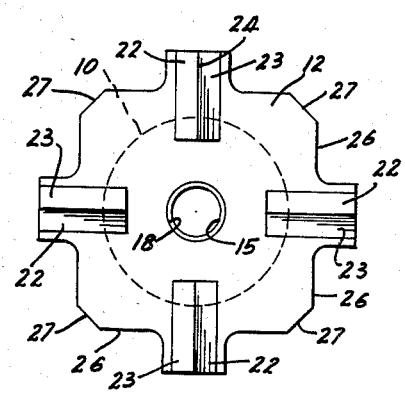
FIG.3
INVENTORS.
MILTON BERLIN
BY LAWRENCE M. RHEINGOLD
*Percy Freeman*
ATTORNEY

2,936,657
DRILL-CENTERING JIG

Milton Berlin, Forest Hills, and Lawrence M. Rheingold, Baldwin, N.Y., assignors to Templet Industries, Incorporated, Brooklyn, N.Y., a corporation of New York Application May 28, 1956, Serial No. 587,767

1 Claim. (Cl. 77—62)

This invention relates to drill jigs and, more particularly to drill jigs that are self-centering relative to the work piece and which automatically align the longitudinal path of movement of the drill bit with the point through which the hole is to be drilled.

Heretofore, various methods and apparatus have been used to guide a drill bit in its longitudinal path of movement into engagement with and through a work piece. Mass production facilities, for example, often provide elaborate jigs which hold the work piece and which include a number of bushings through which the drill bit is guided. When such jigs are not warranted by the type or quantity of production, the point through which the hole is to be drilled in a work piece is some times located by the use of cross-lines such that the point of intersection thereof indicates the center through which the hole is to be drilled. This point is then amplified by means of a center punch so as to provide a starting point for the downward movement of the drill bit. While this procedure is quite conventional and satisfactory for many purposes, it is not usually acceptable where high standards of accuracy or interchangeability are required in that there is a tendency for the drill bit to "creep" as it is moved into engagement with the work. This "creeping" causes the bit to be moved away from its intended path of travel such that the hole cannot be drilled to very close tolerances. An object of this invention, therefore, is to provide a drill jig that is simple in construction, efficient in operation, and which will overcome the aforementioned difficulties.

Another object of this invention is to provide a drill jig of simple construction that may be used in connection with scored cross-lines on a work piece to automatically locate the point of intersection thereof and which will guide the drill bit therethrough.

Still another object of this invention is to provide apparatus for locating a center point for engagement by a drill bit that is self-aligning and extremely accurate.

A still further object of this invention is to provide apparatus for automatically centering and guiding a drill bit into engagement with a work piece in cooperation with guide lines scored on the work piece in which the associated parts are readily visible to the operator during the aligning and drilling operations.

All of the foregoing and still further objects and advantages of this invention will become apparent from a study of the following specification, taken in connection with the accompanying drawings, wherein:

Fig. 1 is an exploded view, in perspective, of a drill jig made in accordance with this invention, shown in conjunction with an associated work piece and drill bit.

Fig. 2 is a longitudinal cross-sectional view of the drill jig shown in Fig. 1, in operative association with the drill bit and work piece.

Fig. 3 is a bottom plan view of the drill jig shown in Figs. 1 and 2.

Referring now to the drawings, a jig made in accordance with this invention is shown to comprise a single element having two major components, viz., a cylindrical bushing hub 10 and a self-indexing base 12. The bushing 10 is provided with a centrally disposed and longitudinally extending bore 15 that is adapted to receive and guide the drill bit 16 of a corresponding diameter, of a drill (not shown), therethrough. The upper extremity of the bore 15 is provided with a bevel 17 for facilitating the engagement of the drill bit therewith, and the lower extremity of the bore is provided with a similar bevel 18 which allows the free passage of the drill bit therethrough. The base 12 of the jig is provided with a plurality of legs 21 which depend therefrom and are spaced 90 degrees apart around the longitudinal axis of the bore 15, such that each leg 21 is in alignment with one other leg, as more clearly shown in Fig. 3. The arrangement is such that each such pair of legs is contained in a plane that also contains the longitudinal axis of the bore 15, whereby the line formed by the intersection of the two planes is coincident with the axis of the bore. Each leg 21 is triangular in configuration and has a pair of inclined surfaces 22, 23 meeting along an edge 24 and defining an acute angle therebetween. The vertical sides 26 of the jig base are set in from the outer extremities of the associated legs 21 and each side is spaced from an adjacent side by a chamfer 27, which arrangement makes the parts quite visible to the machine operator in aligning and using the jig. The inner end of each leg 21 is spaced considerably from the circumference of the bore 15 to provide for chip clearance.

In operation, if it is desired to bore a hole through a plate such as a metallic plate 29, a pair of perpendicularly intersecting lines 30, 31 are drawn such that the point of intersection thereof is the point through which the bore is desired to be drilled. If desired, a center punch may be used to place a starting point 33 at the intersection of the cross-lines. The cross-lines 30, 31 are scored as deeply as practical, after which the drill jig is placed on the work piece with the edges 24 in engagement therewith. It will become apparent, that when the jig is placed in engagement with the score lines, each pair of legs 21 will engage the respective cross-line so as to automatically place the longitudinal axis of the bore 15 into alignment with the center point 33 of the cross-lines. As shown in Fig. 2, the edge 24 of each leg 21 is received within the score line such that downward movement of the drill bit 16 is operative to place the leading edge 34 thereof into alignment and engagement with the center point 33. As the drill bit is moved into engagement with the work piece 29, the engagement of the legs 21 with the cross-lines 30, 31, is operative to prevent the jig from creeping or turning relative thereto, which in turn prevents the creeping of the drill bit, whereupon the bit is operative to drill a perpendicular and perfectly centered hole 35 therethrough. In order to facilitate the movement and placement of the jig, the exterior surface of the shaft 10 may be provided with a knurled portion 37, as shown in Fig. 1. The jig may be used for drilling holes of various sizes merely by inserting a bushing of the desired size within the longitudinal bore 15 of the shaft 10.

While this invention has been described with particular reference to the specific form shown in the drawing, it is to be understood that such is not to be construed as imparting limitations upon the invention, which is best defined by the claim appended hereto.

Having thus described our invention, what we claim as new and desire to secure by Letters Patent, is:

A jig comprising in combination a hub having a tubular bore extending longitudinally therethrough, two pairs of pendent spaced legs at the bottom of said hub, each of said legs being triangular in vertical cross-section so as to provide a depending linear acute bottom edge, the acute edges of the first pair of legs being in alignment with one another and disposed on diametrically opposite sides of the axis of said tubular bore, the acute edges of the second pair of legs being in alignment with one another and disposed on diametrically opposite sides of the axis of said tubular bore, the acute edges of said first pair of legs being contained in a plane including the axis of the tubular bore and perpendicular to a plane containing the acute edges of the second pair of legs and said axis of the tubular bore, the line of intersection of said planes being coincident with the axis of said tubular bore, and the inner ends of all of said legs terminating at a substantial distance outwardly from the circumference of said bore, the jig further including arms extending outwardly away from the hub in cruciform contour, the legs being integral with and pendent from the arms and thereby extending radially outwardly beyond the hub so as to expose the acute edges to view.

References Cited in the file of this patent

UNITED STATES PATENTS

| | | |
|---|---|---|
| 1,758,959 | Meesel | May 20, 1930 |
| 2,333,134 | Whitlock | Nov. 2, 1943 |
| 2,428,201 | Cannarili et al. | Sept. 30, 1947 |
| 2,788,684 | Scharf | Apr. 16, 1957 |

OTHER REFERENCES

"Guided Center-Punch Has Crossed Knife-Edges," "American Machinist," page 124, August 29, 1946.